June 30, 1959 H. MAGNUSKI ET AL 2,892,930

COMMUNICATION SYSTEM

Filed Jan. 10, 1955 3 Sheets-Sheet 1

INVENTORS
Henry Magnuski
Andrew J. Affrunti
BY Mueller & Aichele
Attys.

June 30, 1959 H. MAGNUSKI ET AL 2,892,930

COMMUNICATION SYSTEM

Filed Jan. 10, 1955 3 Sheets-Sheet 2

INVENTOR.
Henry Magnuski
Andrew J. Affrunti
BY Mueller & Aichele
Attys.

June 30, 1959 H. MAGNUSKI ET AL 2,892,930

COMMUNICATION SYSTEM

Filed Jan. 10, 1955 3 Sheets-Sheet 3

INVENTORS
Henry Magnuski
Andrew J. Affrunti
BY Mueller & Aichele
Attys.

United States Patent Office 2,892,930

Patented June 30, 1959

2,892,930

COMMUNICATION SYSTEM

Henry Magnuski and Andrew J. Affrunti, Chicago, Ill., assignors to Motorola, Inc., Chicago, Ill., a corporation of Illinois Application January 10, 1955, Serial No. 480,844

22 Claims. (Cl. 250—15)

This invention relates generally to radio relay systems, and more particularly to a frequency diversity microwave relay system wherein signals are transmitted over each link of the relay system at two frequencies, and the channels of the links providing best communication at any time are selected and interconnected to provide a reliable signal path through the entire system.

Radio relay systems have been provided for long distance communications and have been found particularly advantageous in the ultra high frequency or microwave range. Such systems may have a large number of intermediate repeater stations to thereby provide a large number of interconnected relay links. Each microwave carrier may be modulated with a video signal which includes a larger number of different signals in a multiplex system which may be of any one of a number of different types. For example, frequency division multiplex may be provided with 24 to 600 subcarrier channels being provided on a single microwave carrier.

In the foregoing microwave systems, it is extremely important to have continuous high grade communications. However, difficulty has been encountered in that fading occurs at times which reduces the level of the signal received and may result in failure of communication. To overcome this, space diversity reception and/or transmission has been proposed and although this has improved communications, the equipment involved is relatively complicated and the results have not always been entirely satisfactory. It has been found, however, that fading characteristics differ with the frequency of the waves being transmitted and that by providing two transmissions properly spaced in frequency, then when one frequency is attenuated by fading, the other will be relatively strong and vice versa.

It is therefore an object of the present invention to provide an improved microwave communication system utilizing frequency diversity operation.

A further object is to provide a radio relay system wherein simultaneous transmissions are provided over channels of two different frequencies, with automatic means for selecting the channel providing best communication and for applying the signal having priority to this channel.

Another object is to provide a radio relay system which includes a plurality of communicating links each providing communication on two different frequencies, in which the channel at the frequency providing best communication of the various links are interconnected to provide a continuous communication path through the entire system.

A still further object of this invention is to provide an improved system for comparing the strength of signals transmitted over equipment operating at different frequencies and for selectively connecting the equipment so that the best signals are utilized.

A feature of this invention is the provision of a frequency diversity microwave relay system wherein transmitters operating at two different frequencies and receivers operating at two other frequencies are all connected to the same antenna to provide two channels in both directions, and with the overall equipment being held to a minimum.

Another feature of the invention is the provision of a frequency diversity microwave relay system wherein the signals received on microwave channels at two different frequencies at each station are compared and the channels providing the best communication are interconnected to provide a preferred signal path extending through the entire relay system. In such operation the same signals may be sent at both frequencies and only the signal from the receiver providing best communication used to apply to the transmitters for the next link, or two different communications may be provided with the one which is preferred being sent over the path made up of the best channels of the links and the other communication being sent over the path including the remaining channels of the various links.

A further feature of the invention is the provision of a system for comparing the signals received by two radio receivers at two (or more) points in the receiver, wherein at a first point the relative strength for signals of low level, and at a second point the relative strength of signals of higher level are compared so that accurate sensing takes place over a wide range of signal levels. This may be accomplished in a frequency modulation receiver by deriving signals from two or more different limiter stages wherein the limiting action is a measure of the strength of the signals.

Still another feature of the invention is the provision of a frequency diversity radio relay system wherein pilot signals are transmitted and received to check the operation of the receivers, so that a receiver not reproducing the pilot signal will not be selected even though a strong signal may be present at a predetermined point therein. Sensing of the operation of the modulation amplifier and output of the transmitter are also provided and applied, together with the pilot receiver indications and other indications from the stations, through an alarm circuit to indicate at a monitored point the overall effectiveness of the system and to permit instantaneous detection of the relay station not functioning correctly.

Further objects, features and the attending advantages of the invention will be apparent from a consideration of the following description when taken in connection with the accompanying drawings in which.

Figure 1:
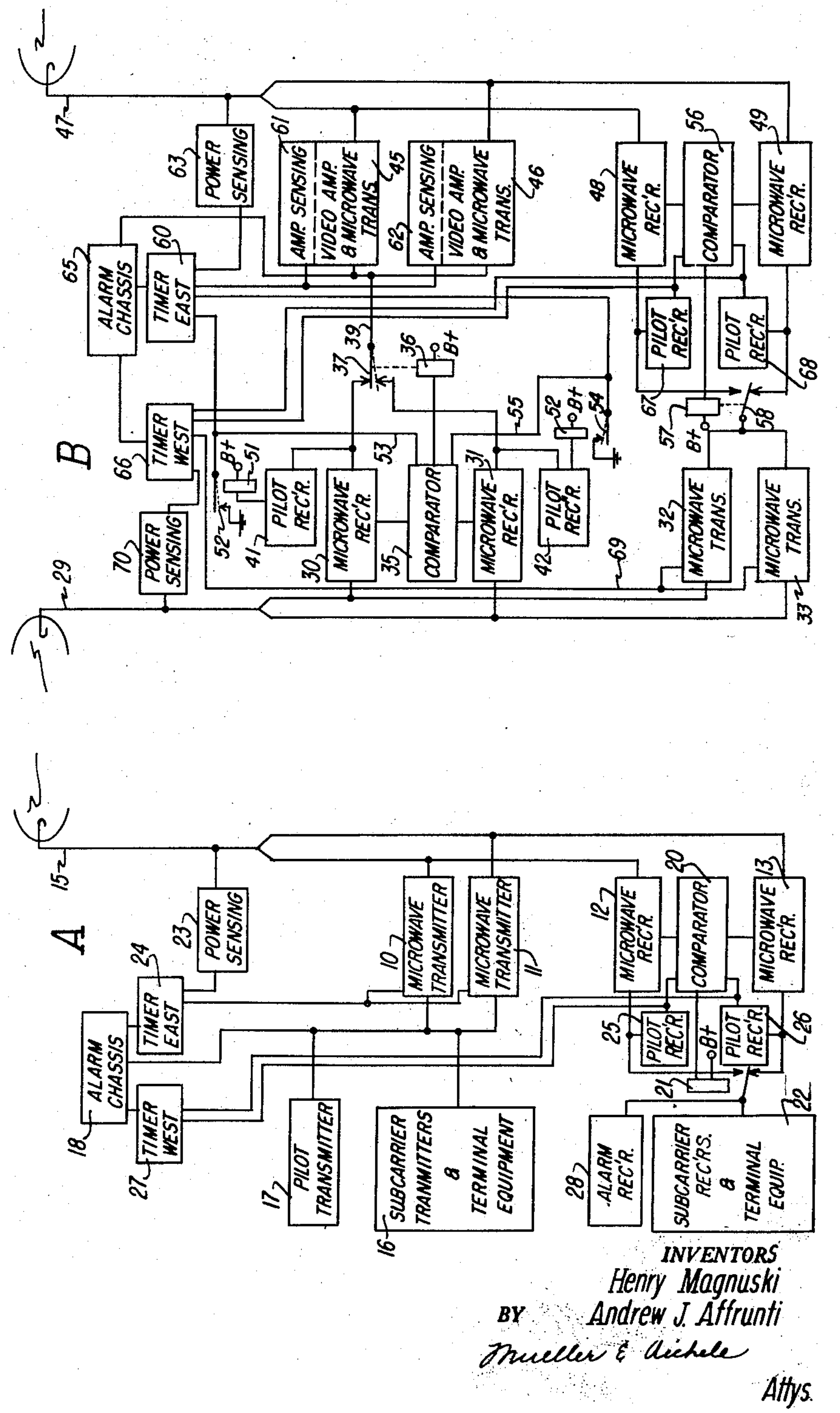
Fig. 1 is a block diagram illustrating one terminal and one intermediate station of a microwave relay system in accordance with the invention.

In practicing the invention, there is provided a microwave radio relay system wherein communications are provided at two different frequencies in each direction of communication. The frequencies are usually in the same frequency band and differ by the order of 3% to 10%, so that the two transmitters and two receivers at each end of each relay link may be connected to a single antenna to thereby simplify the antenna structure including towers, reflectors and the like. The two signals when so separated in frequency and transmitted over the same path will have the characteristic that when one is attenuated by fading the other will be relatively strong and vice versa. The signals from the two receivers are applied to a comparator which selects the receiver producing the best signal. The comparator operates from voltages at two (or more) different points in each receiver to provide an accurate comparison of the received signals over a wide range of signal levels. The comparator selectively connects the receiver providing the best signal either to the transmitters at a relay station, or to the utilization equipment at the terminal stations. The system may be used to transmit only a single complex video signal which is applied to both transmitters at one station, and then applied from the receiver having the best signal to both transmitters at the next relay station. The complex video wave may include a plurality of subcarriers independently modulated by signals or a complex wave of wide band of any other characteristics. As the comparison is made prior to the receiver outputs, the comparison in itself does not establish that the receiver is operating satisfactorily to provide a useful signal. To eliminate this possibility, pilot transmitters are provided at the terminal stations which send signals of a single frequency down the system. This signal is received by both microwave receivers and applied to pilot receivers. The pilot receivers indicate to the comparator when the pilot signal is not received so that a microwave receiver not providing the pilot signal will not be selected by the comparator. Provisions are also made for sensing the effectiveness of the video amplifier and power output of the transmitters, and these indications together with the pilot receiver indications may be transmitted through an alarm system to a monitor receiver provided at one of the stations in the sysem.

It is also possible to transmit two complex signals over the system simultaneously, with one being given priority and being applied over the channels of the various links which provide the best communication. In such case, the comparator must send a signal back to the station being received so that the priority signal is applied to the transmitter of the channel producing the best signal as indicated at the receiver. In the event that good communication is provided at both frequencies, both signals will be effectively transmitted. In the event of failure due to fading, the priority signal will always be applied to the best channel of each link so that the reliability of communication of the priority signal will be greatly increased.

In the foregoing and also in the following description, reference is made to two frequencies of communication. This refers to frequencies of the two channels of each link of the system. In each link, two frequencies are required for transmission and two for reception, making a total of four frequencies. It is to be pointed out that when going from one link to another, usually the frequency will again be changed, so that four further frequencies are necessary, making a total of eight frequencies required in the entire system. Also, the word "channel" is being used to refer to the two communications between the stations of each link, and the word "path" is used to refer to the channels as interconnected to provide a continuous path through the entire system.

Referring now to the drawings, in Fig. 1 there is illustrated in block diagram form a terminal station and a relay station of a microwave relay system in accordance with the invention. The terminal station is indicated at A and is at the west end of the communication system. The relay station is designated B and signals transmitted from A to B will be considered in an eastward direction. Accordingly, signals transmitted from B to A will be considered in the westward direction.

The station A includes microwave transmitters 10 and 11 which operate at two different frequencies. The station also includes microwave receivers 12 and 13, which operate at two other frequencies. The transmitters 10 and 11 and receivers 12 and 13 are all connected to a single antenna 15. The connections from the transmitters and receivers to the antenna may be by wave guides and the antennas may include various reflector structures to direct the waves in desired directions.

Signals are applied to the microwave transmitters 10 and 11 from any suitable source. As previously stated, the transmitters are capable of handling a signal of very wide band width. For example, signals may be provided by various terminal equipment and may modulate subcarrier transmitters as represented at 16. It may be desirable to use as many as 24 or more subcarrier waves, all of which may be provided within the frequency range defined by an octave so that difficulty resulting from cross-modulation is eliminated. The subcarrier waves may be of single side band variety or may be subcarriers frequency modulated by the individual signals, and may frequency modulate the microwave. Signals may also be applied to the microwave transmitters 10 and 11 from a pilot transmitter 17 and an alarm chassis 18, as will be further described.

Signals from the microwave receivers 12 and 13 are applied to the comparator 20 which operates relay 21 to connect one of the receivers to terminal equipment 22. This equipment may be multiplex decoding equipment of any type and when using frequency modulation multiplex transmitting systems as mentioned above, the equipment may include a plurality of subcarrier receivers each connected to a terminal unit for utilizing the signal derived by the receiver. Signals from the microwave receivers 12 and 13 are also applied to the pilot receivers 25 and 26 respectively, and the signal from the selected microwave receiver may be applied to an alarm receiver 28.

At the relay station B, signals are received by antenna 29 and applied to microwave receivers 30 and 31, which may receive the signals transmitted by microwave transmitters 10 and 11 respectively. Also, microwave transmitters 32 and 33 are provided for transmitting signals to be received by the microwave receivers 12 and 13 at station A. The signals received by receivers 30 and 31 are applied to comparator 35, which controls relay 36. Comparator 35 may be identical to comparator 20 at station A. The relay 36 includes contact 37 which normally connects microwave receiver 30 to the video line 39. When the relay 36 is actuated by operation of comparator 35, the contact 37 will assume the dotted line position which connects receiver 31 to the video line 39.

The video line 39, to which the best received signal is applied, is connected to the microwave transmitters 45 and 46, the same signal being applied to both. The transmitters 45 and 46 are connected to antenna 47, which applies signals in an eastward direction to the next relay station, or to a terminal station in a system having only one intermediate relay station. Also connected to the antenna 47 are microwave receivers 48 and 49, which receive signals being transmitted in a westwardly direction from the next station to the east. A comparator 56 is connected to the receivers 48 and 49 and connects the best output thereof to the transmitters 32 and 33 by operation of relay 57. Comparator 56 may be identical to comparators 20 and 35.

Connected to the microwave receivers 30 and 31 at station B are pilot receivers 41 and 42, respectively. These receivers select the signal transmitted by the pilot transmitter 17 at station A. As previously stated, this may be a single carrier frequency which is not modulated so that only a small band width is required. When using a frequency division multiplex system as mentioned, the frequency of the pilot transmitter may be provided between two subcarrier transmitter frequencies without requiring more than the normal separation between the subcarrier frequencies.

The pilot receivers 41 and 42 are connected to relays 51 and 52, respectively. When the pilot signal is received, the receivers are arranged to open the circuit to the relays so that the relays remain unenergized. However, when the pilot signal is not received, the relays will be grounded to close the contacts thereof. Relay 51 will close contacts 52 to provide a ground on the line 53, which goes to the comparator 35. This will cause operation of the comparator to energize relay 36, and receiver 31 will be connected to the utilization line 39. That is, the operation of the pilot relay overrides the comparator action so that even though the comparator would indicate that a stronger receiver signal is received by the microwave receiver 30, the system will still not utilize the signal from this receiver. Similarly, the relay 52 connected to pilot receiver 42 includes contacts 54 which provide a ground to line 55 going to the comparator 35. This will prevent action of the comparator so that the microwave receiver 30 is always connected to the line 39.

The ground connections provided by the contacts 52 and 54 of the pilot receivers are also applied to the timer 60, which operates to provide an alarm in the event that the pilot signal is lost by one or both of the receivers for more than a predetermined time interval. The operation of the timer will be described more in detail hereinafter. The timer also controls the provision of an alarm signal in the event of failure of the transmitter.

The transmitters 45 and 46 each include a video amplifier and a modulated transmitter tube which may be a klystron, magnetron or the like. To test the operativeness of the video amplifiers, sensing units are connected thereto. The sensing units 61 and 62, coupled to transmitters 45 and 46 respectively, may apply a tone of a particular frequency to the input of the video amplifier and select this tone at the output thereof. Accordingly, when the tone is produced at the output at a predetermined level, the amplifier will be operating satisfactorily. The sensing units 61 and 62 produce an indication when the amplitude falls below a predetermined value and apply a ground connection to the timer 60. To check the output of the microwave transmitter, a power sensing device 63 such as a crystal may be applied to the conductor from the transmitters to the antenna 47. This may produce a control when the power being fed to the antenna falls below a predetermined value. Actually, the sensing unit 63 measures the power of both transmitters 45 and 46 and must be sufficiently sensitive that when one fails, the power sensing unit will apply a ground connection to the timer 60.

When a ground connection is applied to the timer 60 showing failure of any one of the components, and if this signal continues for a predetermined time duration, the timer will apply a control connection to the alarm chassis 65. The alarm chassis 65 will then apply a signal to the microwave transmitters which will be carried along the system from one station to another and will be picked up by an alarm receiver at one of the stations. As previously stated, station A is indicated as including an alarm receiver 28. The timer may be set to provide any desired time interval such as, for example, ten minutes. If a failure lasts for more than this time, the timer will actuate the alarm chassis which will send out a predetermined signal.

It is noted that there is also connected to the alarm chassis 65 a timer 66, which is designated timer west. This timer is connected to the pilot receivers 67 and 68, connected to the microwave receivers 48 and 49, which receive signals coming from the east and being directed in a westward direction. The microwave transmitters 32 and 33 at station B will also include sensing means for the video amplifiers thereof which may apply ground connection over line 69 to the timer 66. A power sensing unit 70 may also be provided connected to the conductor supplying the antenna 29 so that when the power being produced by the transmitters 32 and 33 falls below a predetermined level, the sensing unit 70 will operate to apply a control connection to the timer 66.

The alarm signal produced by the alarm chassis 65 may be coded in any desired way to indicate the station from which the alarm is being sent and also to indicate whether the fault is in the system transmitting signals east or in the system transmitting signals west. The alarm chassis may also produce other indications such as indications as to satisfactory operation of tower lights, or an alarm indicating that some person has entered an unattended station.

The terminal station A may include timers 24 and 27 connected to the alarm chassis 18, with the east timer 24 controlling alarms from the power sensing unit 23 and from the video amplifier sensing means of the transmitters 10 and 11. The west timer 27 receives signals from the pilot receivers 25 and 26 and sends an alarm when a fault has lasted a predetermined time.

Figures 2, 3, 4:
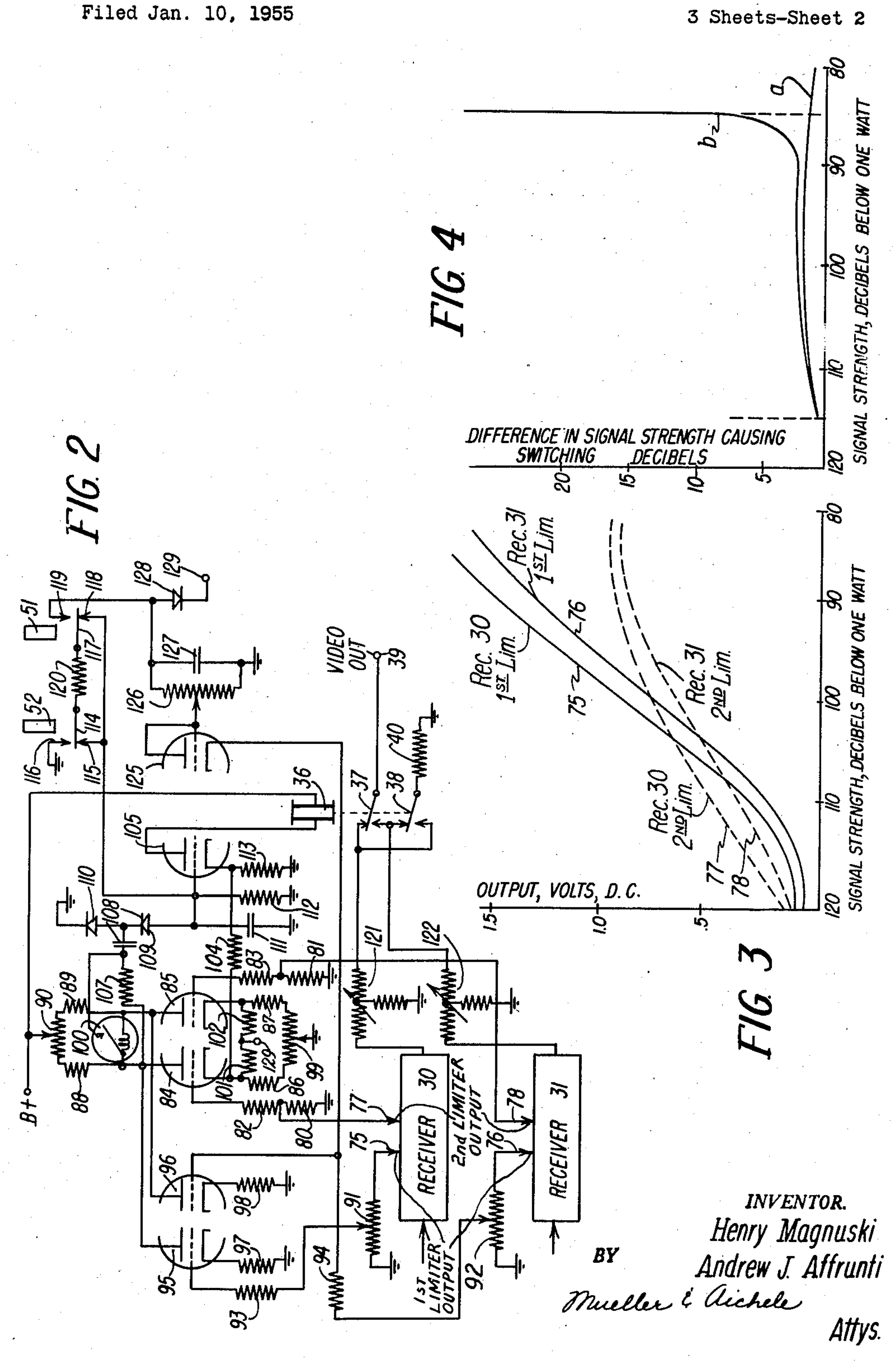
Fig. 2 is a circuit diagram of the comparator circuit used in the system of Fig. 1.
Fig. 3 is a curve illustrating the voltages applied from the receivers of the system to the comparator circuit.
Fig. 4 illustrates the action of the comparator circuit of Fig. 2.

Reference is now made to Fig. 2 which illustrates in detail the circuit of the comparators 20, 35 and 56 of Fig. 1. Actually, the comparator 20 at station A and comparators 35 and 56 at station B may all be identical. Connection of the various components are shown as the comparator 35 is connected in Fig. 1. As previously stated, the comparator operates from two voltages in each receiver in a manner to provide a dependable control for signals of various levels. It has been found that voltages derived from the grids of the first and second limiters in the receivers 30 and 31, which are frequency modulation receivers, will produce voltages which may be used. Accordingly, connection 75 is made to the first limiter of receiver 30 and connection 76 is made to the first limiter of receiver 31. Similarly, connection 77 is made to the second limiter of receiver 30 and connection 78 is made to the second limiter of receiver 31.

Fig. 3 shows the limiter voltages for various signal strengths. It is to be pointed out that the limiter output voltages are not always equal when the same signal is applied to different receivers because the gain of the two receivers may not be the same. Such differences can be balanced out in the comparator as will be explained. Fig. 3 shows a condition in which receiver 30 provides stronger limiter voltages than receiver 31. It will be noted that for a certain range of strong signals, the voltages 75 and 76 derived from the first limiters of the receivers are relatively linear, and that for weaker signals the voltages 77 and 78 from the second limiters are more linear.

Considering now the comparator circuit, the negative voltages from points 77 and 78 are applied across resistors 80 and 81 respectively and through resistors 82 and 83 to the grids of triode sections 84 and 85 of a double triode tube. The cathode of the triodes are grounded through resistors 86 and 87 respectively, which are connected to the end terminals of balancing potentiometer 99. The plates of the tubes 84 and 85 are connected to resistors 88 and 89, which are in turn connected through balancing potentiometer 90 to B plus potential. The negative voltages from the first limiters 75 and 76 are applied to potentiometers 91 and 92, with a portion thereof being applied through resistors 93 and 94 to the grids of triode sections 95 and 96 which may also be included in a single envelope. The cathodes of these tubes are connected to ground through resistors 97 and 98 respectively, and the plates are connected in parallel with the plates of triodes 84 and 85, that is, through resistors 88 and 89 and balancing potentiometer 90 to B plus.

Accordingly, four voltages are applied to a bridge circuit which controls the voltage applied to the direct current contact meter 100 connected to the plates of the tubes. For balancing the bridge, the voltages from the second limiters, are balanced by adjustment of potentiometer 99 connected to the cathodes of the triodes 84 and 85. The voltages from the first limiters may be balanced by the potentiometers 91 and 92 connected to the grids of the tubes. Further balance of the tubes is provided by the potentiometer 90 connected to B plus.

Considering now the operation of the bridge circuit, when the signal in receiver 30 is stronger than that in receiver 31, the voltages 75 and 77 will exceed the voltages 76 and 78 and the triodes 84 and 95 will be rendered less conducting than the triodes 85 and 96. In such condition, the contact meter 100 will remain in open condition as shown. However, when the signal in receiver 31 is greater and one or both of the voltages 76 and 78 exceed the corresponding voltages 75 and 77, one or both of the tubes 85 and 94 will conduct less than the tubes 84 and 95 to cause the contact meter 100 to close its contact. Operation of the contact meter 100 will control the conductivity of the triode 105 which controls the relay 36.

Curve *a* of Fig. 4 shows the change in signal strength required to provide switchover for signals of various strengths. It is noted that for very weak signals (—115 dba) the change required for switchover is less than for stronger signals (—100 dbw). As it is not desired that the system switch over for strong signals, means are provided to prevent this which will be described hereinafter.

Returning to Fig. 2, the contact meter 100 controls switchover of the system through action of the triode 105, which in turn controls relay 36 for connecting the selected receiver to the video line 39. The triode 105 is normally conducting and thereby connects the output of receiver 30 to the video line. When the contact meter 100 closes, the triode is cut off to connect the output of receiver 31 to the video line. This operation is accomplished by the circuit including resistor 107, condensers 109 and 111 and rectifiers 109 and 110, connected from the plate of triode 84 to the grid of tube 105. The grid of tube 105 is connected to ground through resistor 112, and the cathode thereof is grounded through resistor 113. The cathodes of triodes 84 and 85 are connected to a low voltage alternating current source 129 (filament supply) through resistors 101 and 102 respectively. This alternating current appears at the plates of the triodes 84 and 85. When the contact meter 100 is open, the large resistor 107 prevents this alternating current voltage at the plate of triode 84 from reaching the rectifiers 109 and 110. However, when the contact meter 100 closes, and resistor 107 is shorted out, the alternating current voltage is applied through condenser 108 to rectifiers 109 and 110, which are connected as a voltage doubler. The voltage developed thereby across condenser 111 is sufficient to cut off the triode 105. This causes the relay 36 to release and connects receiver 31 to the video line 39. The relay 36 is shown as including an additional set of contacts 38 for connecting the unused receiver to a dummy load formed by resistor 40. It is to be pointed out that it may be desirable to provide one or more slave relays between the control tube 105 and the relay 36.

For further controlling the conduction of the tube 105 so that chattering of the relay 36 is prevented, a circuit is provided including resistor 104 connected from the cathode of triode 84 to the cathode of triode 105. When switchover occurs and the tube 105 is cut off, the voltage drop across resistor 113 is reduced and the voltage on the cathode of triode 84 is pulled down to make this triode more conducting. This further unbalances the bridge to increase the tendency of the contact meter to close. This prevents rapid switching back and forth of the system in response to slight changes in the system. Similarly, when the contact meter 100 opens to render tube 105 conducting, the voltage of the cathode of triode 84 will be restored to restore the balance of the bridge and hold the control tube non-conducting so that the chattering of the relay will be eliminated.

To hold the system so that receiver 30 remains connected as long as a strong signal is received thereby, even though receiver 31 may provide a better signal, the rectifier 125 is connected to the grid of tube 96. This rectifier formed by a diode connected triode is biased by a voltage from potentiometer 126 and condenser 127. This bias voltage is obtained from rectifier 128 connected to point 129 which may be a source of low voltage alternating current, such as used for filaments. The bias voltage applied to the rectifier 125 is controlled by the potentiometer 126. Accordingly, the negative voltage applied to the grid of triode 96 cannot exceed a value determined by the bias obtained from potentiometer 126 as the rectifier 125 would become conducting and would effectively short the resistor 94. Thus, the triode 96 will always be more conductive than triode 95 when strong signals are received, and sufficiently so to hold the contact meter open so that the system will remain in the condition shown with receiver 30 connected to the video line 39. The point of switchover may be adjusted by the potentiometer 126 to prevent switching action by strong signals. This is illustrated by curve *b* of Fig. 4, which shows the control set so that for signals stronger than 85 decibels below one watt, switchover will not take place, even with great change in signal strength.

As previously started, the pilot receivers are operated to lock out the comparator so that when one of the receivers 30 or 31 is not operative, this receiver will not be connected to the video line. In Fig. 1, the pilot receivers 41 and 42 are shown as including relays 51 and 52. These relays are illustrated in Fig. 2, with the relay 52 operating when the pilot tone is not present in the output of receiver 31. This closes contacts 114 and 116 to apply a ground through resistor 120 and contacts 117 and 118 of relay 51 to the grid of triode 105 to hold this tube conducting so that switchover cannot take place. When the pilot tone is not present in receiver 30, relay 51 will close to provide a negative voltage from rectifier 128 through contacts 117 and 119, resistor 120 and contacts 114 and 115 of relay 52, to hold the triode 105 cut off so that receiver 31 will be connected to the video output line 39. It is to be noted that if both relays 51 and 52 close, no action takes place and this is desirable because such operation may indicate failure of the pilot tone source and the main equipment may be operating properly.

Figure 5:
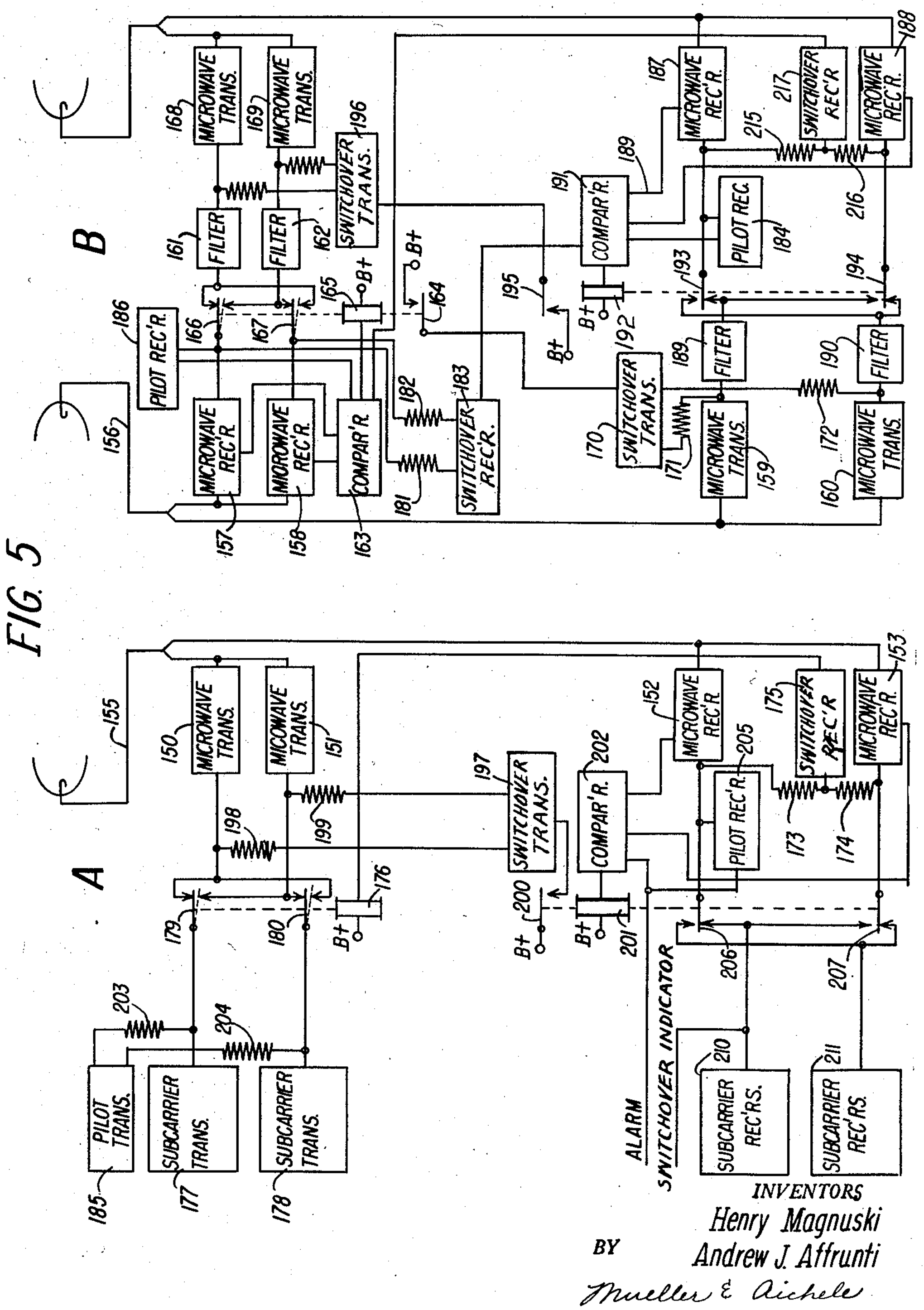
Fig. 5 illustrates a second embodiment of the invention in which two separate communications may be transmitted over the dual frequency system.

In Fig. 5, there is illustrated a second embodiment of the invention which operates to provide frequency diversity communication and which provides two continuous paths through the system in each direction, with preferred signals being sent over the path formed by the best channels of each link of the entire system. At the terminal station A, microwave transmitters 150 and 151 and microwave receivers 152 and 153 are connected to the same antenna 155. Terminal station A communicates with relay station B which includes antenna 156 with microwave receivers 157 and 158 connected thereto, which communicate with transmitters 150 and 151 respectively. Microwave transmitters 159 and 160 are connected to the antenna 156 to communicate with the receivers 152 and 153 at station A. The equipment at relay station B will be described first, since it is believed that this will make the understanding of the invention easier.

The comparator 163 operates relay 165 which includes movable contacts 166 and 167 connected to the receivers 157 and 158 respectively. The contacts 166 and 167 in their normal positions make connections through filters 161 and 162 to the transmitter 168 and 169. When the relay is actuated, the contacts 166 and 167 will move to the dotted positions in which microwave receiver 157 is connected to microwave transmitter 169, and microwave receiver 158 is connected to microwave transmitter 168. Accordingly, the connections of the incoming microwave receivers to the outgoing microwave transmitters are reversed when the relay 165 operates. Therefore, assuming that the communication received by microwave receiver 158 is better than that by microwave receiver 157, the comparator will operate so that the signals from microwave receiver 158 are applied to the best channel of the next link.

The switchover relay 165 also includes contacts 164 which selectively energize the switchover tone transmitter 170. That is, when switchover takes place because of the action of the comparator 163, indicating that receiver 158 is receiving the best signal, the transmitter 170 will be energized. This produces a tone signal which is transmitted over the microwave transmitters 159 and 160, the transmitter 170 being coupled thereto through decoupling resistors 171 and 172. This signal which is received by the microwave receivers 152 and 153 will be applied through decoupling resistors 173 and 174 to the switchover tone receiver 175 at station A. This will operate the relay 176 to change the connection of the subcarrier transmitters 177 and 178 to the microwave transmitters 150 and 151. When the relay 176 is not energized, the contact 179 thereof connects subcarrier transmitter 177 to the microwave transmitter 150, and the relay contact 180 connects subcarrier transmitters 178 to the microwave transmitter 151.

Assuming that the signals from subcarrier transmitters 177 are to be given priority, that is, sent over the best communication path, and also assuming that the microwave receiver 158 at station B receives the strongest signal, then operation of the comparator 163 will energize relay 165 to change the connections at the relay station B. This will also energize switchover tone transmitter 170 which will provide a signal to the switchover tone receiver 175 at station A, causing the relay 176 to operate. Therefore, contacts 179 and 180 will assume the dotted line position which will connect subcarrier transmitters 177 to the microwave transmitter 151. Therefore, the preferred signals will be sent over the best channel which is that provided by the microwave transmitter 151 at station A and the microwave receiver 158 at station B.

To determine which channel from station B to the next station C provides best communication, and to which the preferred signal should be applied, the comparator at the next station C will control a switchover tone transmitter at station C which will communicate back to station B. The switchover tone will be received by receivers 187 and 188 and applied through decoupling resistors 215 and 216 to switchover tone receiver 217. This receiver is coupled to comparator 163. Accordingly, it is seen that the connections to be made by the comparator will depend on the signal received over the preceding link, and also over the next link. Information as to the next link is sent back over the switchover tone transmitter and receiver.

Considering communication at relay station B from the other direction, microwave receivers 187 and 188 will receive signals from the next station (station C) which are applied to comparator 191. The comparator controls relay 192 including contacts 193 and 194 which selectively connects the receivers 187 and 188 to the microwave transmitters 159 and 160. The relay 192 also includes contacts 195 for energizing switchover transmitter 196 which will transmit a signal back to station C indicating that switchover has taken place. Accordingly, the comparator at station C will be controlled in accordance with whether or not switchover has taken place at station B.

Connected to the receivers 157 and 158 at station B through decoupling resistors 181 and 182 is a switchover receiver 183. This is connected to comparator 191 so that the comparator will connect the microwave receiver 187 or 188 providing the best signal to the channel between stations B and A which also provides the best communication. This is controlled by the signal sent out from station A by switchover transmitter 197 which is coupled to the microwave transmitters 150 and 151 through decoupling resistors 198 and 199. The switchover transmitter 197 is controlled by contacts 200 of relay 201 which is in turn controlled by comparator 202 coupled to the microwave receivers 152 and 153. The comparator relay 201 includes contacts 206 and 207 for connecting the microwave receivers 152 and 153 to subcarrier receivers 210 and 211. When the relay 201 is not energized, microwave receiver 152 will be connected to the subcarrier receivers 210 and microwave receiver 153 will be connected to the subcarrier receivers 211. The comparator will operate to connect the microwave receiver providing the best signal to the subcarrier receiver group which is to handle the preferred channel. Assuming that subcarrier receiver 153 provides the best signal, then the comparator will operate so that this signal will be applied to the subcarrier receivers 210. As previously stated, the comparator 202 will energize the switchover transmitter 197 so that a signal will be applied to the switchover receiver 183 at station B to control the comparator 191.

Switchover tone elimination filters are added between each microwave receiver and transmitter at the repeater stations in order to prevent the switchover tone from being transmitted through the entire system and causing switching at other than the desired stations. Filters 161 and 162 remove the switchover tone from the signals applied by receivers 157 and 158 to transmitters 168 and 169. Similarly, filters 189 and 190 eliminate such tones from signals applied from receivers 187 and 188 to transmitters 159 and 160.

As in the previous embodiment, a pilot transmitter 185 is provided at the terminal station A which sends signals over both microwave transmitters 150 and 151 to station B through decoupling resistors 203 and 204. At station B the pilot receiver 186 is provided which is connected to the output microwave receiver 157. The pilot receiver will indicate defective operation of the microwave receiver 157 and is coupled to the comparator 163 so that the comparator will cause the switchover action to connect microwave receiver 158 and make the channel including receiver 158 the path for the signal given priority.

A pilot transmitter will also be provided at the opposite (east) end of the system to send the pilot signals in the direction of stations B and A. At station B, the pilot receiver 184 will respond to the pilot signal and in the event of failure of receiver 187 will cause the comparator 191 to connect receiver 188 in the channel handling the preferred signal. At station A, pilot receiver 205 also controls the comparator 202 so that failure of the microwave receiver 152 will cause the comparators to switch over.

It is therefore seen that in the embodiment of Fig. 5, although a preferred path is established which is made up by the channel in each link which provides best communication, the path provided by the other channels is also continuously connected providing less good communication. It is to be pointed out that the various sensing provisions illustrated in the system of Fig. 1 may also be provided in the system of Fig. 5.

It is therefore seen that a dual frequency radio relay system is provided which results in highly reliable communication. A single multiplex signal which may carry a plurality of channels of information may be transmitted at both frequencies, with the receiver in the system receiving the best signals being connected to the transmitters for relaying the signal down the system. Such a system may be relatively simple since the selected receiver is connected to both transmitters. The system can also be utilized to transmit two separate multiplex signals, one of which is given priority. This system becomes more complicated since the selected receiver at one station must be connected to the transmitter thereof which communicates with the selected receiver at the next station. However, this system has the advantage that both channels in each link are continually utilized to provide two continuous paths through the system. Since satisfactory transmission may be obtained most of the time over both paths, the system provides increased communication. Yet when fading does occur, improved transmission is provided for the channel given priority so that the reliability of communication of this signal is improved.

The dual frequency system includes a comparator circuit which operates effectively to compare signals varying over wide ranges of signal strength. The comparator operates from limiter voltages of frequency modulation receivers but could be utilized with receivers of other types. The comparator is also controlled by pilot signals which override the signal strength comparison so that a receiver which has a break in the continuity thereof will not be selected. Also, when one receiver provides a good usable signal, switching to the other receiver does not take place to thereby avoid unnecessary switchover.

We claim:

1. A radio relay system including a relay station and stations in opposite directions therefrom in the relay system, radio transmitting and receiving equipment at said relay station for providing two way communication between said relay station and the stations in opposite directions therefrom, said equipment including first and second transmitters at said relay station operating at first and second different frequencies, a single antenna connected to said first and second transmitters for providing signals to an adjacent station in one direction in said system, first and second receivers at said relay station for receiving signals of first and second different frequencies, a single antenna connected to said first and second receivers for receiving signals from an adjacent station in the opposite direction in said system, comparing means coupled to said first and second receivers for comparing the strength of the signals received thereby, and means controlled by said comparing means for selectively connecting the one receiver which receives the strongest signal to at least one of said transmitters for applying the signal received by said one receiver to the connected transmitter.

2. A radio relay system including a pair of stations, microwave transmitting and receiving equipment at each of said stations for providing two way communication between said stations, said equipment including first and second transmitters at one station providing carrier waves at first and second different frequencies and a single antenna connected to said first and second transmitters and directing said waves to the other station, said transmitters including means modulating said first and second carrier waves by the same modulating signal, first and second receivers responsive to said first and second frequencies and a second antenna at said other station, said receivers being connected to said second antenna for receiving said carrier waves of said first and second frequencies from said one station, comparing means coupled to said first and second receivers for comparing the strength of the waves received thereby, and means controlled by said comparing means for connecting the receiver which receives the strongest wave to translating means for utilizing the wave received thereby.

3. A radio relay system including a pair of stations, microwave transmitting and receiving equipment at each of said stations for providing two way communication between said stations, said equipment including first and second transmitters at one station providing carrier waves at first and second different frequencies and directing said waves to the other station, means for applying modulating signals to said first and second transmitters, said modulating signals including a pilot signal, first and second receivers at said other station for receiving carrier waves of said first and second frequencies from said one station, means connected to one of said receivers for selecting said pilot signal at the output thereof, and comparing means coupled to said first and second receivers for comparing the strength of the waves received thereby and for selectively connecting said receivers to translating means, said comparing means being connected to said means for selecting said pilot signal and being controlled thereby so the said comparing means connects said one receiver when the pilot signal is received thereby and when said one receiver receives the strongest signal.

4. A radio relay system including a pair of stations, microwave transmitting and receiving equipment at each of said stations for providing two way communication between said stations, said equipment including first and second transmitters at one station providing carrier waves at first and second different frequencies and directing said waves to the other station, means for applying modulating signals to said transmitters, said modulating signals including a pilot signal, first and second receivers at said other station for receiving carrier waves of said first and second frequencies from said one station, pilot means connected to said receivers for selecting said pilot signal at the output thereof, comparing means coupled to said first and second receivers for comparing the strength of the waves received thereby and for selectively connecting said receivers to translating means, said comparing means being connected to said pilot means and being controlled thereby so that said comparing means connects said one receiver when the pilot signal is received thereby and when said one receiver receives the strongest signal, sensing means coupled to said transmitters for indicating improper operation thereof, and alarm means coupled to said pilot means and to said sensing means and applying signals to said transmitters to indicate failure of said pilot signal and improper operation of said transmitters.

5. A radio relay system including a pair of stations, microwave transmitting and receiving equipment at each of said stations for providing two way communication between said stations, said equipment including first and second transmitters at one station providing carrier waves at first and second different frequencies and directing said waves to the other station, means for applying modulating signals to said transmitters, said modulating signals including a pilot signal, first and second receivers at said other station for receiving carrier waves of said first and second frequencies from said one station, pilot means connected to said receivers for selecting said pilot signal at the output thereof, comparing means coupled to said first and second receivers for comparing the strength of the waves received thereby and for selectively connecting said receivers to translating means, said comparing means being connected to said pilot means and being controlled thereby so that said comparing means connects said one receiver only when the pilot signal is received thereby and when said one receiver receives the strongest signal, and alarm means coupled to said pilot means and to said transmitters for applying a signal through said relay system when the pilot signal is not present in one of said receivers.

6. A radio relay system including a relay station and stations in opposite directions therefrom in the relay system, microwave transmitting and receiving equipment at said relay station for providing two way communication between said relay station and the stations in opposite directions therefrom, said equipment including first and second transmitters at said relay station providing carrier waves at first and second different frequencies, means for applying the same modulating signals to said first and second transmitters, a single antenna connected to said first and second transmitters for directing waves therefrom to an adjacent station, and first and second receivers at said relay station connected to said antenna for receiving the carrier waves of first and second different frequencies from an adjacent station, comparing means coupled to said first and second receivers for comparing the strength of the waves received thereby, and means controlled by said comparing means for connecting the receiver which receives the strongest wave to translating means for utilizing the modulating signals derived thereby.

7. A radio relay system including a pair of stations and microwave transmitting and receiving equipment at each of said stations for providing two way communication between said stations, said equipment including first and second transmitters at one station providing carrier waves at first and second different frequencies, a single antenna connected to said first and second transmitters for directing said waves to the other station, means for applying the same modulating signals to said first and second transmitters, first and second receivers and a single antenna connected thereto at said other station, said antenna receiving carrier waves of said first and second frequencies from said one station and applying the same to said receivers, said first and second receivers responding to said first and second frequencies respectively, first and second transmitters at said other station for retransmitting the received waves, comparing means coupled to said first and second receivers for comparing the strength of the waves received thereby, and means operated by said comparing means for connecting the receiver which receives the strongest wave to said first and second transmitters at said other station for retransmission of received signals.

8. A radio relay system including a pair of stations, microwave transmitting and receiving equipment at each of said stations for providing two way communication between said stations, said equipment including first and second transmitters at one station providing carrier waves at first and second different frequencies and directing said waves to the other station, means for applying the same modulating signals to said first and second transmitters, said modulating signals including a pilot signal, first and second receivers at said other station for receiving carrier waves of said first and second frequencies from said one station, means connected to said receivers for selecting said pilot signal at the output thereof, and comparing means coupled to said first and second receivers for comparing the strength of the waves received thereby and for connecting the receiver which receives the strongest wave to translating means, said comparing means being connected to said means for selecting said pilot signal and being controlled thereby so that said comparing means connects one receiver when said pilot signal is received by said one receiver only.

9. A radio communication system including a pair of stations, radio transmitting and receiving equipment at each of said stations for providing two way communication between said stations, said equipment including first and second transmitters at one station operating at first and second different frequencies, a single antenna connected to said first and second transmitters for radiating signals to the other station, means for applying first and second signals to said transmitters with said first signal being given priority, first and second receivers and a single antenna connected thereto at said other station for receiving signals of said first and second frequencies from said one station, said first and second receivers being responsive to said first and second frequencies respectively, comparing means coupled to said first and second receivers for comparing the strength of the signals received thereby, and means controlled by said comparing means for transmitting a control signal from said other station to said one station to control the application of said first and second signals to said transmitters so that said first signal is applied to the transmitter communicating with the receiver which receives the strongest signal.

10. A radio relay system including a pair of stations, radio transmitting and receiving equipment at each of said stations for providing two way communication between said stations, said equipment including first and second transmitters at one station operating at first and second different frequencies for providing signals to the other station, means for applying first and second modulating signals to said transmitters with said first signal being given priority, said first and second modulating signals including a pilot signal, first and second receivers at said other station for receiving signals of said first and second frequencies from said one station, comparing means coupled to said first and second receivers for comparing the strength of the signals received thereby and for selecting the receiver providing the strongest signal, pilot means connected to one of said receivers and to said comparing means for causing said comparing means to reject said one receiver in the absence of said pilot signal, and means controlled by said comparing means for transmitting a control signal from said other station to said one station to control the application of said first and second signals to said transmitters so that said first signal is applied to the transmitter communicating with the selected receiver.

11. A radio relay system including at least three stations, radio transmitting and receiving equipment at each of said stations for providing two way communication between said stations, said equipment including first and second transmitters at a first station operating at first and second frequencies for transmitting signals to a second station, means for applying first and second signals to said transmitters with said first signal being given priority, first and second receivers at said second station for receiving signals of said first and second frequencies from said first station, first and second transmitters at said second station operating at third and fourth frequencies for transmitting signals to a third station, first and second receivers at said third station for receiving signals of said third and fourth frequencies from said second station, comparator means at said second and third stations coupled to said first and second receivers thereat for selecting the receiver which receives the strongest signals, means at said second and third stations controlled by said comparator means for transmitting control signals therefrom to said first and second stations respectively to control the application of said first and second signals to said transmitters at said first and second stations, so that said first signal is applied to the transmitters communicating with the selected receivers.

12. A radio relay system including at least three stations, radio transmitting and receiving equipment at each of said stations for providing two way communication between said stations, said equipment including first and second transmitters at a first station operating at first and second frequencies for providing signals to a second station, means for applying first and second signals to said transmitters with said first signal being given priority, first and second receivers at said second station for receiving signals of said first and second frequencies from said first station, first and second transmitters at said second station operating at third and fourth frequencies for providing signals to a third station, first and second receivers at said third station for receiving signals of said third and fourth frequencies from said second station, first comparator means at said second station coupled to said first and second receivers thereat for selecting the receiver thereat which receives the strongest signal, means at said second station controlled by said comparator means for transmitting a control signal therefrom to said first station, means at said first station responsive to said control signal for selectively applying said first and second signals to said transmitters at said first station so that said first signal is applied to the transmitter communicating with the selected receiver at said second station, second comparator means at said third station for selecting the receiver thereat which receives the strongest signal, means at said third station controlled by said second comparator means for transmitting a second control signal therefrom to said second station, and connecting means at said second station responsive to said second control signal for selectively connecting said receivers at said second station to said transmitters thereat, said connecting means connecting the selected receiver at said second station to the transmitter thereat communicating with the selected receiver at said third station.

13. A radio relay system including a pair of stations, microwave transmitting and receiving equipment at each of said stations for providing two way communication between said stations, said equipment including first and second frequency modulation transmitters at one station providing carrier waves at first and second different frequencies and directing said waves to the other station, first and second frequency modulation receivers at said other station for receiving carrier waves of said first and second frequencies from said one station, each of said receivers including first and second limiters, and comparator means at said other station coupled to said first and second receivers for comparing the strength of the waves received thereby and for selectively connecting the receiver which receives the strongest signal to translating means, said comparator means including first and second pairs of electron discharge valves each including an output electrode and a control electrode for controlling the current flow in said output electrode, means connecting said control electrodes of said first pair of valves to said first limiters of said first and second receivers, means connecting said control electrodes of said second pair of valves to said second limiters of said first and second receivers respectively, bridge means connected to said output electrodes of said valves for balancing the current therein produced by said first receiver against the current therein produced by said second receiver, and means controlled by the current in said bridge means for indicating the relative strength of the carrier waves in the first and second receivers.

14. A radio relay system including a pair of stations, microwave transmitting and receiving equipment at each of said stations for providing two way communication between said stations, said equipment including first and second frequency modulation transmitters at one station providing carrier waves at first and second different frequencies and directing said waves to the other station, first and second frequency modulation receivers at said other station for receiving carrier waves of said first and second frequencies from said one station, each of said receivers including first and second limiters, translating means for utilizing the received signal, and comparator means at said other station coupled to said first and second receivers for comparing the strength of the waves received thereby, said comparator means including connector means normally connecting said first receiver to said translating means, and operating to connect said second receiver thereto when the carrier wave received by said second receiver is stronger than the signal received by said first receiver, said comparator means including first and second pairs of electron discharge valves each including an output electrode and a control electrode for controlling the current flow in said output electrode, means connecting said control electrodes of said first pair of valves to said first limiters of said first and second receivers, means connecting said control electrodes of said second pair of valves to the second limiters of said first and second receivers respectively, bridge means connected to said output electrodes of said valves for balancing the current therein produced by said first receiver against the current therein produced by said second receiver, said connector means being controlled by the current in said bridge means, and means connected to at least one of said valves for controlling the current therein in response to waves in said first receiver of a strength exceeding a predetermined value so that the current in said bridge means is insufficient to operate said connector means.

15. A radio relay system including a pair of stations, microwave transmitting and receiving equipment at each of said stations for providing two way communication between said stations, said equipment including first and second frequency modulation transmitters at one station providing carrier waves at first and second different frequencies and directing said waves to the other station, said transmitters being modulated by signals including pilot signals, first and second frequency modulation receivers at said other station for receiving carrier waves of said first and second frequencies from said one station, pilot means connected to said receivers for indicating the presence of the pilot signal at the receiver outputs, each of said receivers including first and second limiters, and comparator means at said other station coupled to said first and second receivers for comparing the strength of the waves received thereby, said comparator means including first and second pairs of electron discharge valves each including an output electrode and a control electrode for controlling the current flow in said output electrode, means connecting said control electrodes of said first pair of valves to said first limiters of said first and second receivers, means connecting said control electrodes of said second pair of valves to the second limiters of the first and second receivers respectively, bridge means connected to said output electrodes of said valves for balancing the current therein produced by said first receiver against the current therein produced by said second receiver, translating means for utilizing the received signals, and control means coupled to said bridge means for selectively connecting said receivers to said translating means, said pilot means being connected to said control means for controlling the same so that a receiver which receives the strongest carrier wave is connected thereby in the presence of said pilot signal at the output of said receiver.

16. A comparator circuit for use with a pair of frequency modulation radio receivers having first and second limiters and operating at different frequencies, said circuit selecting the receiver providing the strongest signal and including in combination, first and second pairs of electron discharge valves each including an output electrode and a control electrode for controlling the current flow in said output electrode, means connecting said control electrodes of said first pair of valves to the first limiters of the first and second receivers, means connecting said control electrodes of said second pair of valves to the second limiters of the first and second receivers respectively, bridge means connected to said output electrodes of said valves for balancing the current therein produced by the first receiver against the current therein produced by the second receiver, and means controlled by the current in said bridge means for indicating the relative strength of the carrier waves in the first and second receivers.

17. A comparator circuit for use with a pair of radio receivers operating at different frequencies to select the receiver having the strongest signal, said circuit including in combination, first and second pairs of electron discharge valves each including an output electrode and a control electrode for controlling the current flow in said output electrode, means connecting said control electrodes of said first pair of valves to the first and second receivers respectively at corresponding points thereon providing voltages representing the strength of carrier waves received thereby, means connecting said control electrodes of said second pair of valves to the first and second receivers respectively at other corresponding points thereon providing voltages representing the strength of carrier waves received thereby, bridge means connected to said output electrodes of said valves so that the current produced in said output electrodes by the first receiver is balanced against the current produced therein by the second receiver, translating means for utilizing the received signals, switch means controlled by the current in said bridge means for normally connecting said first receiver to said translating means and connecting said second receiver thereto when the current in said bridge means exceeds a predetermined value, and means connected to said control electrode of one of said valves connected to said first receiver for limiting the voltage applied thereto so that the current in said bridge means is insufficient for connecting said second receiver when the signal received by said first receiver exceeds a predetermined strength.

18. A comparator circuit for use with a pair of radio receivers operating at different frequencies for selectively connecting the receiver having the strongest signal to translating means, said comparator circuit including in combination, first and second pairs of electron discharge valves each including an output electrode and a control electrode for controlling the current flow in said output electrode, means connecting said control electrodes of said first pair of valves to the first and second receivers respectively at corresponding points thereon providing voltages representing the strength of carrier waves received thereby with said voltages reducing conduction in said valves as the strength of said carrier waves increase, means connecting said control electrodes of said second pair of valves to the first and second receivers respectively at other corresponding points thereon providing voltages representing the strength of carrier waves received thereby with said voltages reducing conduction in said valves as the strength of said carrier waves increase, bridge means connected to said output electrodes of said valves so that the current produced in said output electrodes by the first receiver is balanced against the current produced therein by the second receiver, a normally conducting control valve operating to connect the first receiver to the translating means and operating when cut off to connect the second receiver to the translating means, means coupling said control valve to said bridge means for cutting off said control valve in response to increased voltages resulting from increased signals in said second receiver, and means coupling said control valve to one of said electron discharge valves connected to said first receiver for increasing the conductivity of said one valve when said control valve is cut off.

19. A comparator circuit for use with a pair of radio receivers operating at different frequencies for selectively connecting the receiver having the strongest signal to translating means, said comparator circuit including in combination, first and second pairs of electron discharge valves each including an output electrode and a control electrode for controlling the current flow in said output electrode, means connecting said control electrodes of said first pair of valves to the first and second receivers respectively at corresponding points thereon providing voltage representing the strength of carrier waves received thereby with said voltages reducing conduction in said valves as the strength of said carrier waves increase, means connecting said control electrodes of said second pair of valves to the first and second receivers respectively at other corresponding points thereon providing voltages representing the strength of carrier waves received thereby, with said voltages reducing conduction in said valves as the strength of said carrier waves increase, bridge means connected to said output electrodes of said valves so that the current produced in said output electrodes by the first receiver is balanced against the current produced therein by the second receiver, said bridge means including contact means held open when said valves connected to the first receiver are less conducting than said valves connected to the second receiver and closed when said valves connected to the first receiver are more conducting than said valves connected to the second receiver, a control valve normally conducting operating to connect said first receiver to the translating means, means controlled by said contact means and responsive to closing of said contact means for applying a voltage to said control valve for cutting off said control valve and thereby connect said second receiver to the translating means.

20. A comparator circuit for use with a pair of radio receivers operating at different frequencies for selectively connecting the receiver having the strongest signal to translating means, said comparator circuit including in combination, a pair of electron discharge valves each including a cathode, an anode and a control electrode, means connecting said control electrodes of said valves to the first and second receivers respectively at corresponding points thereon providing voltage representing the strength of carrier waves received thereby with said voltages reducing conduction in said valves as the strength of said carrier waves increase, means for applying alternating current voltage to said valves, bridge means connected to said output electrodes of said valves so that the current produced in said output electrodes by the first receiver is balanced against the current produced therein by the second receiver, said bridge means including contact means held open when said valve connected to the first receiver is less conducting than said valve connected to the second receiver and closed when said valve connected to the first receiver is more conducting than said valves connected to the second receiver, a normally conducting control valve operating to connect said first receiver to the translating means, a bias circuit including resistance means and rectifier means connecting said control valve to said anode of one of said electron discharge valves, said contact means being connected to said bias circuit to short said resistance means so that the alternating current voltage at said anode of said one valve is applied to said rectifier means, means applying the voltage from said rectifier means to said control valve to cut off said control valve and thereby connect said second receiver to the translating means.

21. A radio communication system including first and second stations having radio receiving and transmitting equipment thereat for providing two-way radio communication therebetween, said equipment at said first station including first and second transmitters and a single antenna coupled thereto, means for applying the same modulating signals to said first and second transmitters, said first and second transmitters providing carrier waves at first and second different frequencies with said waves being radiated from said single antenna, said second frequency differing from said first frequency by the order of 3 to 10 percent, said second station including first and second receivers and a second single antenna, said second antenna receiving the transmitted waves and applying the same to said receivers, said first and second receivers being constructed to receive waves of said first and second frequencies respectively, and means coupled to said receivers for utilizing the received signals.

22. A radio communication system including first and second stations having radio receiving and transmitting equipment thereat for providing two-way radio communication therebetween, said equipment at said first station including first and second transmitters and a single antenna coupled thereto, said first and second transmitters providing carrier waves at first and second different frequencies with said waves being radiated from said single antenna, said second station including first and second receivers and a second antenna, said second antenna receiving the transmitted waves and applying the same to both said receivers, said first and second receivers being constructed to receive waves of said first and second frequencies respectively, said carrier waves of said first and second frequencies being subject to fading with said frequencies being selected so that the wave of one frequency is relatively strong when the wave of the other frequency becomes weak, and means coupled to said receivers and responsive to the level of the signals therein for controlling the utilization of the received signals.

References Cited in the file of this patent

UNITED STATES PATENTS

| | | |
|---|---|---|
| 2,253,832 | Whitaker | Aug. 26, 1941 |
| 2,514,425 | Thompson | July 11, 1950 |
| 2,521,696 | De Armond | Sept. 12, 1950 |
| 2,555,557 | Peterson et al. | June 5, 1951 |
| 2,610,292 | Bond et al. | Sept. 9, 1952 |
| 2,699,495 | Magnuski et al. | Jan. 11, 1955 |
| 2,718,589 | Staples | Sept. 20, 1955 |